No. 639,941. Patented Dec. 26, 1899.
C. ROSSI-DIEHL.
EDUCATIONAL MODEL.
(Application filed Sept. 1, 1899.)

(No Model.)

WITNESSES:
J. H. Niles.

INVENTOR
Conrad Rossi-Diehl
BY
ATTORNEYS

UNITED STATES PATENT OFFICE.

CONRAD ROSSI-DIEHL, OF HOBOKEN, NEW JERSEY.

EDUCATIONAL MODEL.

SPECIFICATION forming part of Letters Patent No. 639,941, dated December 26, 1899.

Application filed September 1, 1899. Serial No. 729,263. (No model.)

*To all whom it may concern:*

Be it known that I, CONRAD ROSSI-DIEHL, a citizen of the United States, residing in Hoboken, in the county of Hudson and State of New Jersey, have invented certain new and useful Improvements in Educational Models, of which the following is a specification.

My invention relates to improvements in educational models by which it is intended to explain the interdependent relationship existing between the so-called "geometric solids"—such as the sphere, cube, and pyramid—said models being used in exemplifying and teaching in a concise and practical manner form-lessons in connection therewith and certain new definitions of forms which are based on the same and which form my elemental system of so-called "form sequences."

The object of the invention is to explain by natural or structural forms my form sequences to the physical eye, while by the constructive lessons demonstrated by the models the mind, as the seat of activity or inventiveness, is appealed to and educated.

In carrying out my invention a set of models is employed, which is composed of the sphere, cube, and pyramid, in such a manner that one is developed from the other; and the invention consists more particularly of a set of educational models comprising a cube, being the maximum cube of a given sphere, spherical segments taken on the planes of the top and bottom sides of the cube, and spherical segments obtained at each of the remaining sides of the cube.

The invention consists, next, of the subdivision of said primary cube into a double-pyramidal core and a number of tetrahedral bodies, said core and tetrahedral bodies being adapted to be built up around said core, so as to form the cube, while on the cube are then placed the spherical segments necessary for making the sphere.

Figure 1:
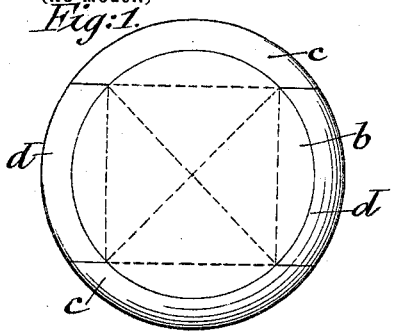
Figure 2:
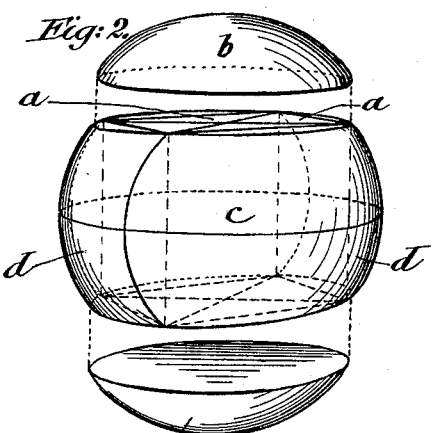
Figure 3:
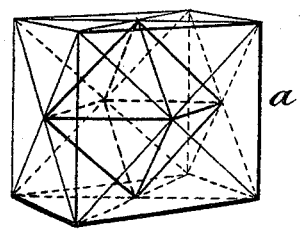
Figure 4:
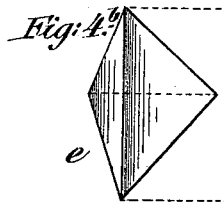
Figure 4:
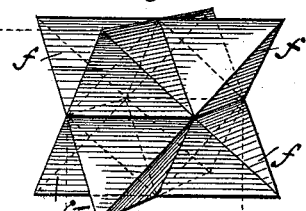
Figure 5:
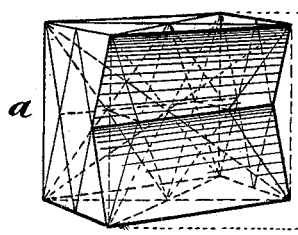
Figure 6:
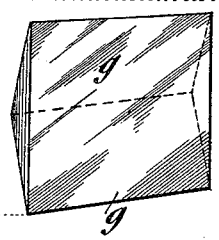
Figure 6:
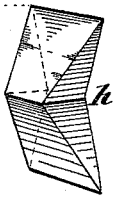
Figure 6:
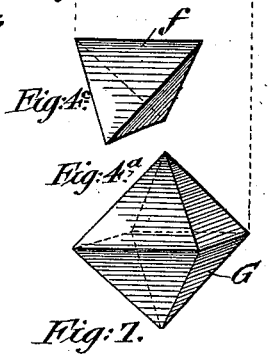
Figure 6:
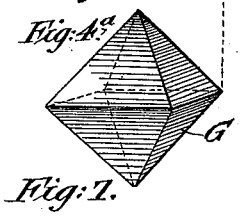
Figure 6:
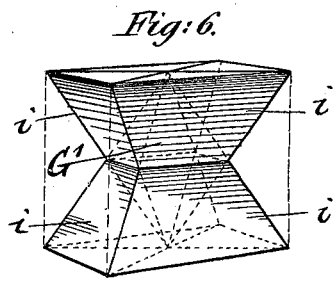
Figure 9:
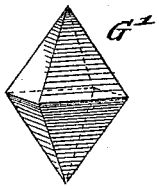
Figure 7:
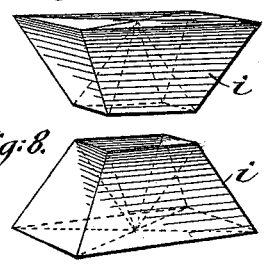
Figure 8:
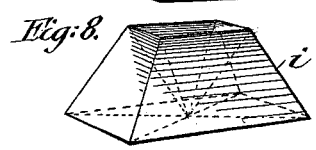

In the accompanying drawings, which illustrate my improved educational models, Figure 1 represents a plan view of a sphere within which is constructed the maximum cube capable of being contained in the same. Fig. 2 is a perspective view of the subdivision of the sphere into the maximum cube contained therein and the spherical segments formed at the top, bottom, and sides of the cube. Fig. 3 is a perspective view of the cube shown as further subdivided into a central double-pyramidal core and twelve tetrahedral side pieces. Fig. 4 is a perspective view of the portion of the cube remaining after the twelve tetrahedral side pieces are removed. Fig. $4^a$ is a perspective view of the double-pyramidal core obtained after removing from said body the eight tetrahedral corner-pieces. Figs. $4^b$ and $4^c$ are perspective views of one piece of each set of tetrahedral side and corner pieces which are successively removed from the cube. Fig. 5 is a perspective view of a cube subdivided in a different manner, one of its side prisms being removed. Fig. $5^a$ is a perspective view of the prism removed from Fig. 5. Fig. $5^b$ is a perspective view of the polyhedral body removed from each opposite end of the cube. Fig. 6 is a perspective of a double-pyramid frustum remaining after the bodies shown in Figs. $5^a$ and $5^b$ have been removed. Figs. 7 and 8 are perspectives of the two pyramid frustums separated, from which a double-pyramidal core is removed; and Fig. 9 is a perspective view of this double-pyramidal core.

Similar letters of reference indicate corresponding parts.

Referring to the drawings, $a$ represents the maximum cube which can be described within a given sphere, the diameter of which is equal to the diagonal connecting two diagonally opposite corners of the cube. By extending the plane of two parallel sides of the cube, such as the top and bottom, until these planes intersect with the sphere surrounding the cube $a$ two regular spherical segments $b$ $b$ are formed. The planes of two opposite remaining sides of the cube are likewise extended until they intersect with the sphere, thus forming spherical segments $c$ $c$, which are equal in width to the side of the cube, but longer than the same. The spherical segments $d$ $d$ are then separated on the planes of the remaining two sides of the cube, their inner surfaces corresponding to the ends of the cube $a$, as shown in Fig. 2. The cube $a$ is then subdivided according to diagonal lines drawn on its top, bottom, and sides and a set of twelve tetrahedral side pieces $e$ of the shape shown in Fig. $4^b$ removed therefrom, said side pieces being obtained by passing planes through diagonal lines of adjacent sides, as shown in Fig. 4, so that a body of the form shown in Fig. 4 remains. By removing another set of eight tetrahedral corner-pieces $ff$ of the shape shown in Fig. 4$^c$ from the body shown in Fig. 4 a double-pyramidal core G is obtained, which can be again divided into two pyramids having a square base each.

In place of dividing the cube in the manner shown in Figs. 3, 4, 4$^a$, 4$^b$, and 4$^c$ it can be divided in the manner shown in Fig. 5, in which the intersections of the diagonal lines of the top and bottom of the cube $a$ are connected, respectively, by suitable planes with the base edges of said top and bottom, whereby interpenetrating pyramids are obtained, the intersections of which form, likewise, a square figure and a double-pyramidal core or center. If two opposite sides of this square figure formed at the center of the cube are extended up to their intersection with the opposite sides of the cube, as shown in Fig. 5, and lines are drawn which connect these intersecting points with the adjacent corners of the cube, then two side prisms $g$ and two polyhedral end bodies $h$, as shown in Figs. 5$^a$ and 5$^b$, may be removed, so that a double-pyramid frustum is obtained, which is formed of two truncated pyramids, the abutting plane of which is equal to the square obtained at the interior of Fig. 5 by the interpenetrating pyramids. When from the two truncated pyramids shown in Figs. 7 and 8 a double-pyramidal center core G' is removed, the perimeter of which is equal to the abutting square of said pyramids, then a subdivision of the original cube is obtained which is analogous to that shown in Figs. 3 to 4$^c$, but which is obtained by a different process of subdivision. The common characteristic of both subdivisions of the cube is that each produces a double-pyramidal core the apices of which are each located at the intersections of the diagonal of the top and bottom sides. Still other subdivisions into tetrahedrons, prisms, and other polyhedral bodies may be made, arriving at the same result.

All the parts referred to may be connected with each other by any suitable mechanical means—such as pins, hinges, clasps, bands, and the like—while the models may be made of wood or metal, papier-mâché, or other suitable material.

The individual parts are fitted together one to the other, so as to form the sphere or completed structure.

By the model described it is possible to deduce from the sphere a cube and from the latter the sets of tetrahedrons, prisms, and polyhedrons contained in the same, so that my form system can be illustrated by the form sequences thus obtained.

By my improved educational models the following fundamental principles of form construction can be readily taught: First, form is the sum total of measure relations; second, the various structural form elements are interchangeable and interdependent; third, form construction proceeds along fixed lines of progressive measure relations; fourth, the main principles of form construction are radiation, perpendicularity, parallelism, and tangency; fifth, progressive form-numbers have nothing in common with arithmetic numerics, and, sixth, form construction is the prime factor in all true artwork, which depends on intelligent form experiment and correct form reasoning consequent thereto.

Having thus described my invention, I claim as new and desire to secure by Letters Patent—

1. An educational model, consisting of a center cube being the maximum cube of a given sphere described around the same, and of six spherical segments, one being formed along each side of said cube and completing said sphere, substantially as set forth.

2. An educational model, consisting of a center cube, two spherical segments obtained by the intersections of the extended planes of the top and bottom sides of the cube with a given sphere described around said cube, and four spherical segments, one being formed along each of the remaining sides of said cube, substantially as set forth.

3. An educational model, consisting of a center cube, spherical segments, obtained by the extensions successively of the planes of the top and bottom sides, and of two opposite sides, to the intersections of said planes with the sphere in which said cube is described, and spherical segments obtained on the remaining two sides of said cube, substantially as set forth.

4. An educational model, composed of a central core of double-pyramidal shape and two sets of tetrahedral side and corner pieces built up around the same so as to form a cube, substantially as set forth.

5. An educational model, composed of a central core of double-pyramidal shape, a set of twelve tetrahedral side pieces and a set of eight tetrahedral corner-pieces built up around said core so as to form a cube, substantially as set forth.

6. An educational model, consisting of a central double-pyramidal core, the apices of which are located at the intersections of the diagonals of the top and bottom sides of a cube having a common axis with said core, and a series of polyhedral bodies built up around the same so as to form a cube, substantially as set forth.

In testimony whereof I have signed my name to this specification in the presence of two subscribing witnesses.

CONRAD ROSSI-DIEHL.

Witnesses:
AIMÈ J. B. GIRARD,
FELIX C. ROSSI-DIEHL.